United States Patent [19]

Hulvey

[11] Patent Number: 5,767,915
[45] Date of Patent: Jun. 16, 1998

[54] DIGITAL COLOR BURST PHASE SWITCH FOR PAL VIDEO SYSTEMS

[75] Inventor: Robert W. Hulvey, Hermosa Beach, Calif.

[73] Assignee: TRW Inc., Redondo Beach, Calif.

[21] Appl. No.: 592,745

[22] Filed: Dec. 12, 1995

[51] Int. Cl.$^6$ ................................................ H04N 9/45
[52] U.S. Cl. .......................... 348/509; 348/539; 348/549
[58] Field of Search ........................... 348/509, 505–508, 348/536–539, 549, 521, 498, 500, 571, 639, 662; 386/46, 9, 10, 12, 1; H04N 9/45, 9/455, 5/12

[56] References Cited

U.S. PATENT DOCUMENTS

| | | | |
|---|---|---|---|
| 3,878,557 | 4/1975 | Vidovic | 386/4 |
| 3,900,885 | 8/1975 | Tallent et al. | 386/12 |
| 4,024,572 | 5/1977 | Derenbecher, Jr. | 348/509 |
| 4,268,853 | 5/1981 | Nakamura et al. | 348/521 |
| 4,339,770 | 7/1982 | Dennison et al. | 348/498 |
| 4,389,663 | 6/1983 | Tatami | 348/505 |
| 4,463,371 | 7/1984 | Lewis, Jr. | 348/539 |
| 4,466,022 | 8/1984 | Ota | 386/10 |
| 4,477,847 | 10/1984 | Knight et al. | 386/94 |
| 4,504,862 | 3/1985 | Achtstaetter | 348/500 |
| 4,506,286 | 3/1985 | Kashigi | 348/662 |
| 4,598,310 | 7/1986 | Brand et al. | 348/505 |
| 4,605,953 | 8/1986 | Wilkinson et al. | 348/639 |
| 4,663,654 | 5/1987 | Morrison | 348/509 |
| 4,697,207 | 9/1987 | Lilley | 348/505 |
| 4,769,691 | 9/1988 | Dischert | 348/505 |
| 4,878,128 | 10/1989 | Yasumura et al. | 386/9 |
| 5,053,862 | 10/1991 | Phillips et al. | 348/505 |
| 5,243,412 | 9/1993 | Goukura et al. | 348/505 |
| 5,253,042 | 10/1993 | Yasuda | 348/506 |
| 5,311,296 | 5/1994 | Ikefuji et al. | 348/505 |
| 5,499,375 | 3/1996 | Miyaguchi | 386/46 |

*Primary Examiner*—Tommy P. Chin
*Assistant Examiner*—Y. Lee
*Attorney, Agent, or Firm*—Michael S. Yatsko

[57] ABSTRACT

A digital color burst phase switch for determining phase shift of a color burst signal in a PAL video signal includes a phase selector for selecting either a first reference clock or a second reference clock in response to a PAL switch signal. A phase delay device delays the phase of either the first reference clock or the second reference clock selected by the phase selector to generate a third reference clock. A phase comparator compares the phase of the third reference clock to the phase of the color burst signal to generate a control signal. The control signal is integrated over substantially the entire color burst signal to generate an integration value. This integration value is compared to a threshold value in a threshold device to generate a correction signal. A PAL switch generator generates the PAL switch signal in response to the correction signal such that the phase selector selects either the first reference clock or the second reference clock having a phase substantially corresponding to the phase of the color burst signal.

24 Claims, 7 Drawing Sheets

DIGITAL COLOR BURST PHASE SWITCH FOR PAL VIDEO SYSTEMS

BACKGROUND OF THE INVENTION

1. Field of the Invention

This invention relates generally to digital processing of analog video signals and, more particularly to a digital color burst phase switch for PAL (Phase Alternation by Line) video systems.

2. Discussion of the Related Art

Today there are many video products which process digital representations of analog video signals. For example, video digitizers, digital video scramblers and descramblers, televisions, video cassette recorders and video recorders which record analog video in a digital format. In each of these video products, the analog video signal is generally digitized and stored in memory for subsequent use.

If the analog video signal is not digitized and stored in memory or read out of memory substantially the same way as it is received, several problems are encountered (i.e. analog video signal is out of sync). These problems include the displacement of raster lines which causes the picture to blur and color fringing which causes incorrect color in the picture.

In order for the analog video signal received by the video product to be processed in synchronization, phase-locking of the analog video signal is generally performed to provide a digital reference clock using conventional analog circuitry. However, use of such conventional analog phase-locking circuitry has been found to be inadequate for most digital processing purposes because of the above-identified problems, as well as because of the large number and size of the components required.

Digital phase-locking can be used in place of analog phase-locking to reduce or eliminate the blurring and color fringing, however, use of conventional digital phase-locking techniques also has several disadvantages. Specifically, a very large number of digital gates are ordinarily required which is costly. This also makes it extremely difficult, if not impossible to integrate such circuitry into a single integrated circuit. Still further, such conventional digital techniques generally require a separate digital circuit which is exclusively used only for phase-locking purposes. Moreover, DC offset in each raster line (i.e. horizontal line) of the digital data may also cause the raster lines to be displaced thus causing the picture to blur.

Still further, phase-locking to PAL (Phase Alternation by Line) video signals also poses a unique difficulty. In PAL video signals, the color subcarrier (i.e. color burst) signal alternates by 90° or π/2 radians for each horizontal line of video signal. From one horizontal line to the next, the color burst signal will alternately advance or retreat by 90°, yielding two possible phases. Thus, in order to phase-lock to the PAL video signal, a device is required to discriminate between the two phases.

What is needed then is a digital color burst phase switch for PAL video systems which will discriminate between the two PAL phases to provide an efficient means for phase-locking to a color burst signal in a PAL video signal. This will, in turn, eliminate raster line misalignment and color fringing in PAL video signals, reduce the number of gates required and the cost, and enable the system to be incorporated into a single integrated circuit with other video processing circuitry. It is, therefore, an object of the present invention to provide such a digital color burst phase switch for PAL video systems.

SUMMARY OF THE INVENTION

In accordance with the teachings of the present invention, a digital color burst phase switch for determining phase shift of a color burst signal in a PAL video signal is disclosed. The digital color burst phase switch determines the alternating 90° phase shift of the color burst signal of the PAL video signal to enable a phase error detector to lock to this color burst signal. This is basically achieved by phase alternating a reference clock generated by the phase error detector in synchronization with the alternating phase of the color burst signal.

In one preferred embodiment, a phase selector which is responsive to a PAL switch signal selects either a first reference clock or a second reference clock. A phase delay device delays the phase of either the first reference clock or the second reference clock selected by the phase selector to generate a third reference clock. A phase comparator compares the phase of the third reference clock to the phase of the color burst signal to generate a control signal. An integration device integrates the control signal over substantially the entire color burst signal to generate an integration value. The integration value is compared with a threshold value in a threshold device to generate a correction signal. A PAL switch generator generates the PAL switch signal in response to the correction signal such that the phase selector selects either the first reference clock or the second reference clock which has a phase substantially corresponding to the phase of the color burst signal.

Use of the present invention provides a digital color burst phase switch for determining phase shift of a color burst signal in a PAL video signal. As a result, the aforementioned difficulties associated with phase-locking to a color burst signal in a PAL video signal has been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiment concerning a digital color burst phase switch for PAL (Phase Alternation by Line) video systems is merely exemplary in nature and is no way intended to limit the invention or its application or uses. Moreover, while the present invention is described in detail below with reference to various hardware devices, it will be appreciated by those skilled in the art that the present invention can also be implemented in software.

Figure 1:
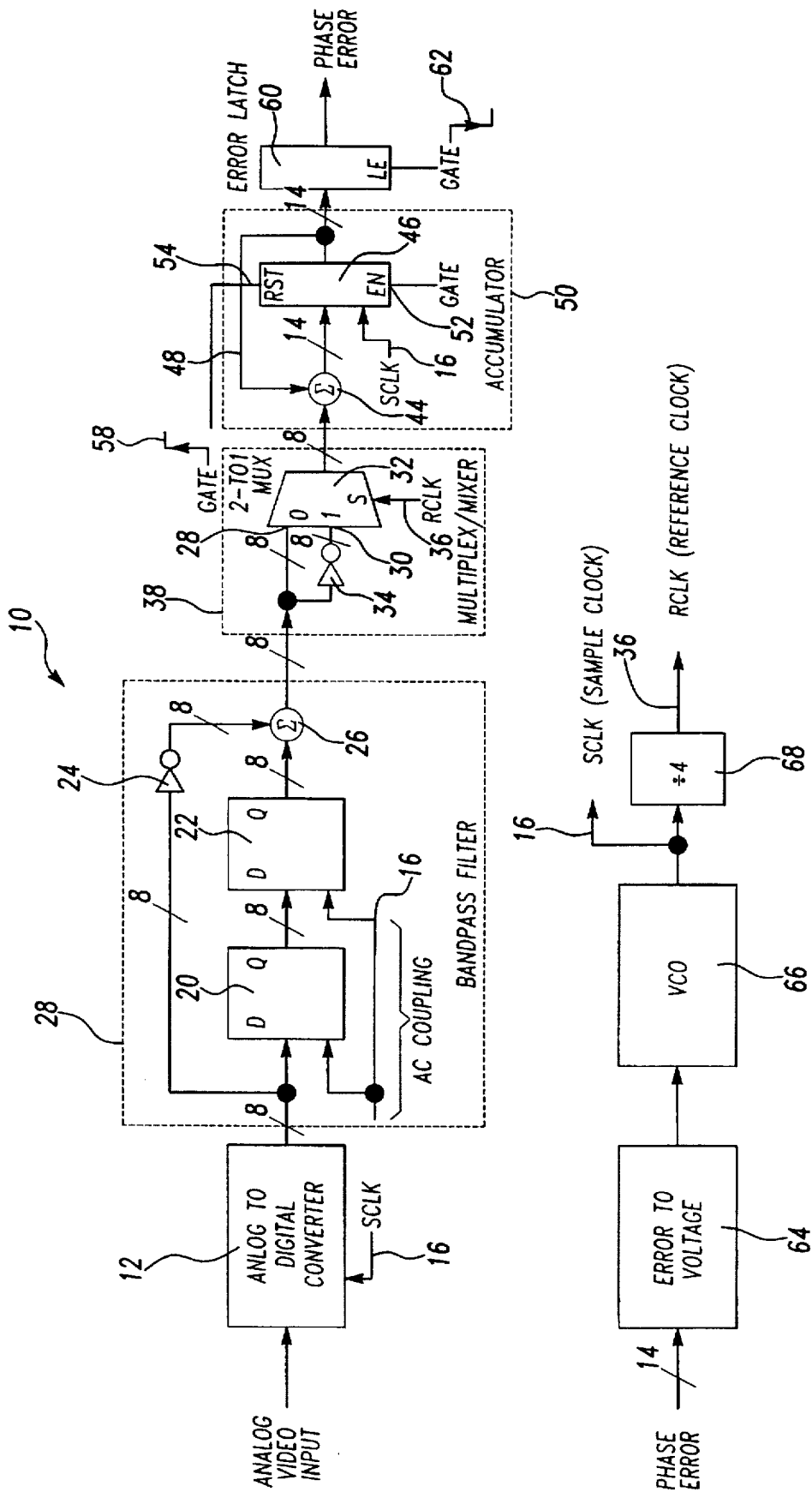
FIG. 1 is a schematic block diagram of a digital phase error detector utilized by the present invention.

Referring to FIG. 1, a schematic block diagram of a digital phase error detector 10 for locking to a color subcarrier of a PAL (Phase Alternation by Line) analog video signal is shown. It will be appreciated by those skilled in the art, that while a detailed description of the phase error detector 10 is set forth below, other types of phase error detectors can also be used. Moreover, the operation of the phase error detector 10 will be initially discussed with the assumption that no 90° phase shift of the color burst signal occurs between horizontal lines.

Figure 2:
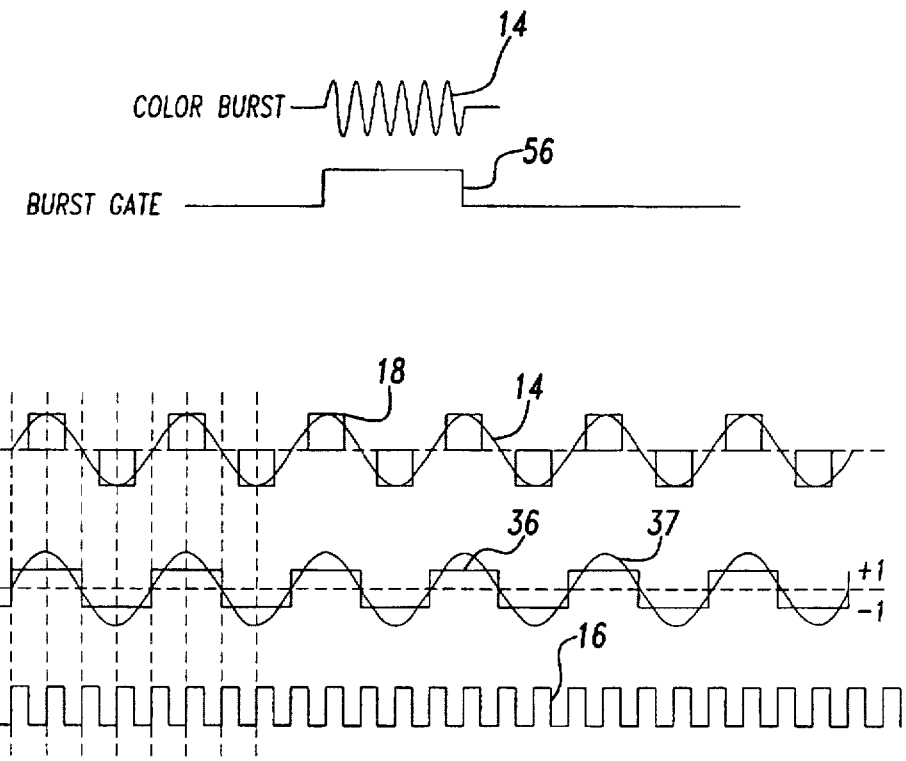
FIG. 2 is a series of various waveform diagrams utilized and generated by the digital phase error detector in FIG. 1.
Figure 7:
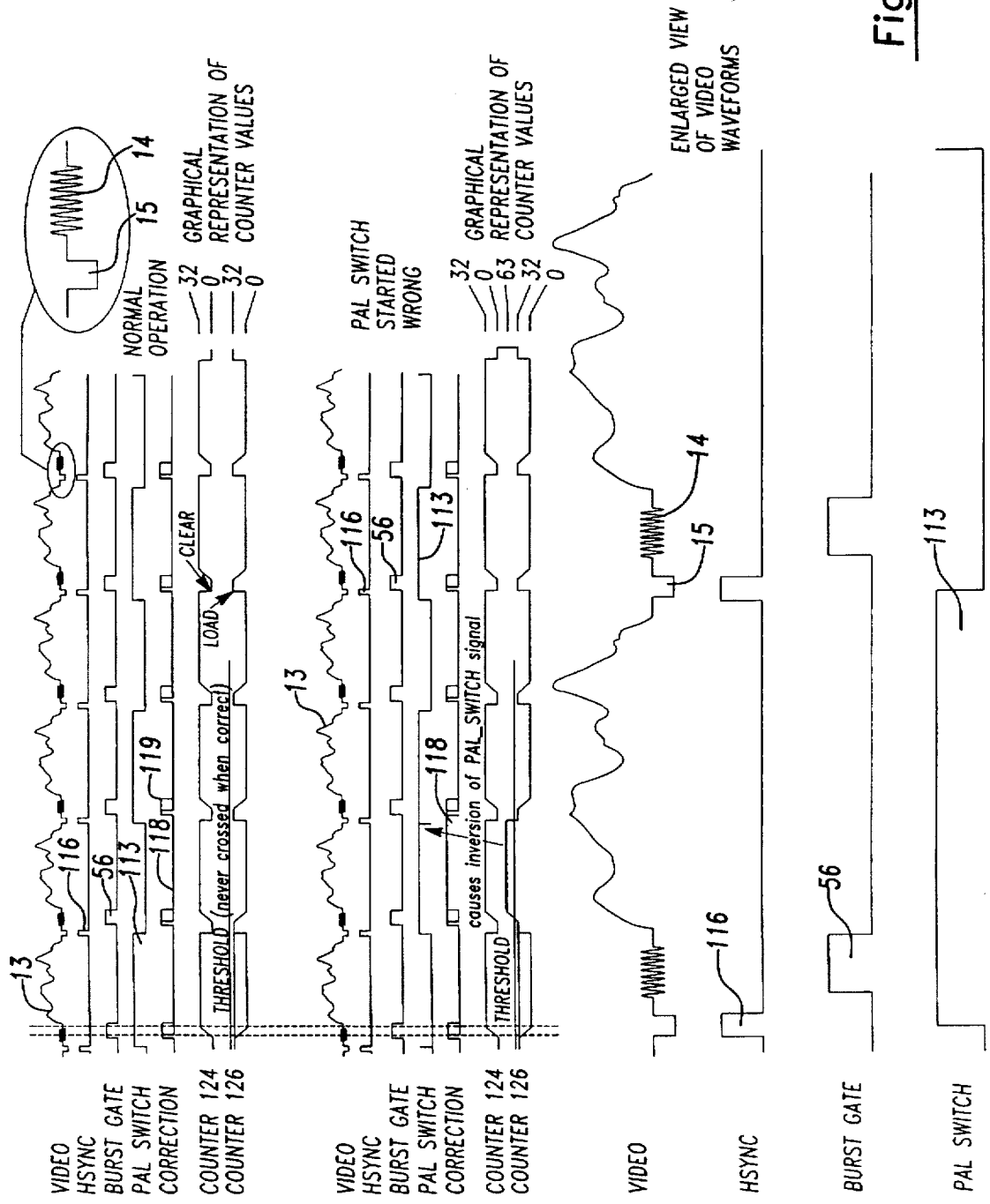
FIG. 7 is a series of various waveform diagrams utilized and generated by the present invention.

The digital phase error detector 10 utilizes an 8-bit analog-to-digital converter 12 for receiving a PAL analog video signal 13. The analog video signal 13 includes a color burst signal 14, as shown in FIGS. 2 and 7, which is between about 6 to 10 cycles of a sine wave of chrominance subcarrier frequency. This color burst signal 14 occurs about every 64 μsec. at the beginning of each raster line in the PAL analog video signal 13 after a sync pulse 15. The color burst signal 14 is the signal used to establish a reference for demodulating the chrominance signal and is the portion of the analog video signal 13 which the digital phase error detector 10 will be phase-locked or frequency-locked with. This will ultimately provide a stable sample clock (SCLK) 16 for use when digitizing the analog video signal with the analog-to-digital converter 12, as well as for clocking the digital data into memory and subsequently reading the digital data out of memory. An enlarged waveform of the color burst signal 14 is also shown in FIG. 2, which includes a square wave representation 18 of the color burst signal 14 superimposed over the color burst signal 14.

The analog-to-digital converter 12 digitizes the color burst signal 14 in the analog video signal 13 and outputs an 8-bit digital representation of the square wave 18 each time the analog-to-digital converter 12 is clocked by the sample clock (SCLK) 16. The color burst signal 14 is sampled by the analog-to-digital converter 12 at an arbitrary but constant phase which means that the digital phase error detector 10 is essentially functioning as a frequency-locked loop. Each 8-bit sample of digital data represents a number corresponding to the amplitude of the square wave 18. For example, if the square wave 18 is substantially in phase with the sample clock (SCLK) 16 and the peak-to-peak amplitude of the square wave 18 sampled is 85 millivolts and 35 millivolts with a center reference of 60 millivolts, the 8-bit samples would toggle between the numbers 85, 60, 35, 60, 85, etc. This occurs because it takes four (4) sample clock pulses (SCLK) 16 to sample one (1) cycle of the color burst signal 14. The sample clock (SCLK) 16 thus has a frequency of about 17.72 MHz which is about four (4) times the color burst frequency of about 4.43 MHz.

The digital data stream from the analog-to-digital converter 12 is applied along an 8-bit parallel data bus (i.e. 8 lines) to a first 8-bit digital register 20 and a second 8-bit digital register 22, as well as to an inverter 24, with the outputs being subsequently summed by an adder 26. This combination essentially forms a bandpass filter 28 which performs AC coupling to eliminate the DC offset from the color burst signal 14 as it is initially digitized and received in the phase detector 10. Each 8-bit digital register 20 and 22 delays the digital data stream by one (1) sample clock (SCLK) 16, thus a delay of two (2) sample clocks (SCLK) 16 occurs before the digital data reaches the adder 26 through the registers 20 and 22. The digital data stream that is applied to the inverter 24 is inverted before it is also applied to the adder 26.

It should also be noted that the entire phase error detector 10 utilizes two's (2's) complement digital signals whereby when the most significant bit (MBS) is a "1", this represents a negative number, while if the most significant bit (MBS) or top bit is a "0", this represents a positive number. The two's (2's) complement format is used when the digital data is inverted, as well as for determining leading and lagging phase error. Accordingly, for proper two's complement arithmetic in the adder 26, a digital "1" is fed into the adder 26 carry bit.

At the adder 26, the inverted digital data is summed with the digital data delayed by two (2) sample clocks (SCLK) 16 or 180° out of phase with the digital data coming from the inverter 24. By doing this, the DC offset of the color burst signal 14 is eliminated as it is sampled and before further digital processing is conducted. This assures that the DC offset from raster line to raster line of data is eliminated, which is needed because DC offset would create an unwanted error signal at the output of a mixer utilized in the present invention, as well as subsequent circuitry which will be discussed in detail shortly.

Figure 3:
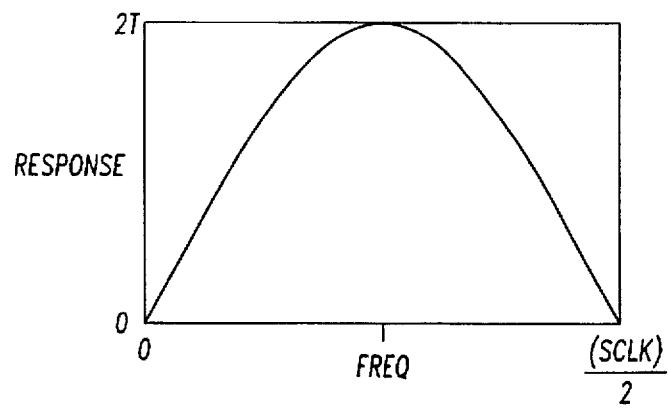
FIG. 3 is a graph of the filter response of a bandpass filter utilized by the digital phase error detector in the present invention.

For example, as previously indicated, assuming that the peak-to-peak voltage of the square wave 18 is 85 millivolts and 35 millivolts with a 60 millivolt center reference, the 60 millivolt center reference would eventually be eliminated so that you would have a square wave 18 having a peak-to-peak voltage of +50 millivolts and −50 millivolts with a center reference of zero (0) millivolts. Referring to FIG. 3, the filter response of the bandpass filter 28 is shown. As seen in FIG. 3, the filter 28 has a maximum response at the color burst 14 frequency of about 4.43 MHz.

The digital data stream from the bandpass filter 28 is applied to a "0" input 28 and a "1" input 30 of a 2 to 1 multiplexer 32, with the digital data applied to the "1" input 30 being inverted by an inverter 34 before being applied to the multiplexer 32. The multiplexer 32 acts as a 2 to 1 switch and switches based on a reference clock (RCLK) 36, which essentially forms a multiplier or mixer 38. The reference clock (RCLK) 36, as shown in FIG. 2, has a frequency of about 4.43 MHz which is about one-fourth the sample clock (SCLK) 16 frequency of about 17.72 MHz. The reference clock (RCLK) 36 is essentially the same frequency as the color burst signal 14. The reference clock (RCLK) 36 provides two high clocks and two low clocks causing two cycles of noninverting digital data to pass through the multiplexer 32 and two cycles of inverted digital data to pass through the multiplexer 32 (i.e. "0", "0", "1", "1", "0", . . . ).

Figure 4:
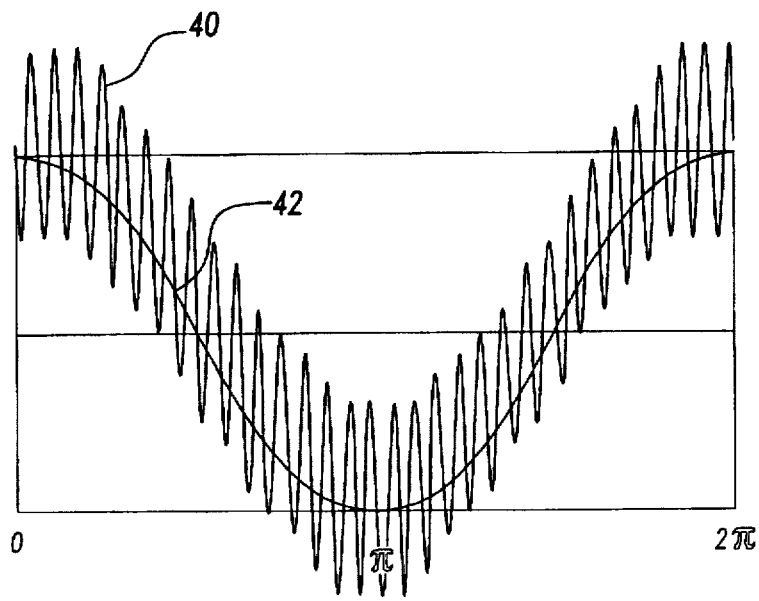
FIG. 4 is a waveform diagram representing an analog representation of an output from a mixer utilized in the digital phase error detector.

An analog representation of the output from the mixer 38 is shown in FIG. 4. This analog representation essentially consists of the product of the input sine wave or color burst signal 14 and the reference clock (RCLK) 36 sine wave 37, shown in FIG. 2, which is the sum and the difference of the frequencies of these sine waves. The high frequency waveform 40 consists of both the sum and difference of the waveforms (i.e. $F_{COLOR\ BURST}+F_{RCLK}$ and $F_{COLOR\ BURST}-F_{RCLK}$) and the low frequency waveform 42 consists of the mean of the waveform 40 known in the art as the "beat note." Using the mean or essentially the difference frequency allows the phase error to be determined between the color burst signal 14 and the reference clock (RCLK) 36 similar to a phase detector where a known reference frequency is multiplied times its quadrature to get phase error.

If the low frequency waveform 42 is flat line or DC, this indicates no phase error between the waveforms 14 and 37.

The digital data from the multiplexer 32 is applied to a 14-bit adder 44 in combination with a 14-bit digital register 46 having a feedback loop 48. This forms an accumulator 50 which in combination with the mixer 38 generally forms a phase detector. Additionally, the accumulator 50 performs the function of filtering out the sum frequency component (i.e. $F_{COLOR\ BURST}+F_{RCLK}$) of waveform 40. The number of data lines or bits is increased from 8-bits to 14-bits following the adder 44 to accommodate the accumulation of data in the 14-bit digital register 46. The 14-bit digital register 46 includes an enable port 52 and a reset port 54 which are triggered by a burst gate signal 56, shown in FIGS. 2 and 7, which originates from a gate 58. The burst gate signal 56 is high when the color burst signal 14 is active and goes low when the six (6) to ten (10) cycles of the color burst signal 14 ends. Thus, about twenty-four (24) to forty (40) sample clocks (SCLK) 16 worth of digital data is accumulated from the mixer 38 in the 14-bit digital register 46. This data is accumulated as the enable port 52 is held high from the burst gate signal 56. As the data is accumulated, the sum component (i.e. $F_{COLOR\ BURST}+F_{RCLK}$) is generally cancelled out and the difference component (i.e. $F_{COLOR\ BURST}-F_{RCLK}$) or beat note is all that remains. When the burst gate signal 56 goes low, the reset port 54 resets the accumulator to zero (0) as the accumulated data is simultaneously applied to a 14-bit digital register or error latch 60 on the trailing edge of a gate 62.

This accumulated digital data represents the phase error between the color burst signal 14 and the reference clock (RCLK) 36 and is stored in the error latch 60 until the error latch 60 is subsequently gated to receive a new phase error. If the sample clock (SCLK) 16 is accurate or correct, the digital value accumulated in the accumulator 50 should equal zero (i.e. waveform 42 would have a frequency =0 or DC). If the phase of the sample clock (SCLK) 16 is advanced, a positive number would result, while if the phase is retarded, a negative number would result under two's complement arithmetic.

The phase error stored in the error latch 60 is continuously applied to an error-to-voltage circuit 64 which converts the digital phase error to a DC control voltage so as to vary the frequency of a voltage controlled oscillator (VCO) 66 to track the frequency of the color burst signal 14 with the reference clock (RCLK) 36, via a divide by four (4) circuit 68. This ultimately implements a phase-lock or frequency-lock loop which generates the sample clock (SCLK) 16 having a frequency of about 17.72 MHz to be used during digitization of the analog video signal 13, as well as for clocking this digitized data into and out of memory (not shown) for subsequent manipulation by a video product.

Figure 5:
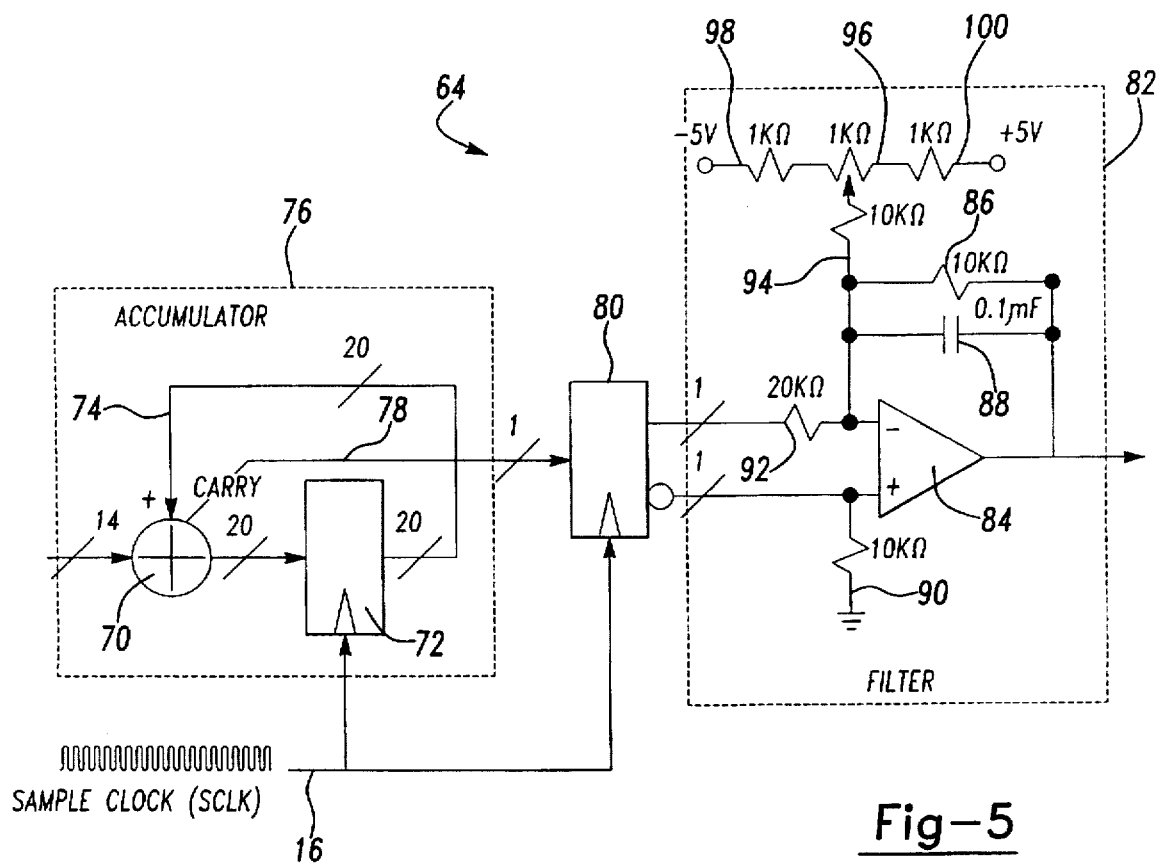
FIG. 5 is a schematic block diagram of an error to voltage circuit utilized by the digital phase error detector.

Turning to FIG. 5, a detailed schematic block diagram of the error-to-voltage circuit 64 is shown. The error-to-voltage circuit 64 includes a 20-bit adder 70 and a 20-bit digital register 72 having a feedback loop 74. This forms an accumulator 76 similar to the accumulator 50, shown in FIG. 1. The accumulator 76 has an output 78 which is the carry bit from the adder 70. As the adder 70 continuously sums the digital data from the error latch 60 and the digital data exceeds the 20-bit limit, the carry bits 78 are not carried over to another summer, but are sent to a 1-bit digital register 80. The digital data from the error latch 60 is stable for each raster line period following each color burst signal 14 which has been digitized. The duty cycle of the carry bits are directly proportional to the value of the digital data continuously entering the adder 70, which creates a continuous pulse width modulated (PWM) output 78 having a typical duty cycle of between about 30% to 70% with the output varying once per raster line of digital data. This forms an inexpensive digital-to-analog converter which uses significantly less gates to produce.

The carry bits are then applied to the 1-bit digital register 80 to generate a clean differential phase error signal which is applied to an analog loop filter 82 primarily consisting of an op-amp 84. The op-amp 84 is configured with a 10K ohm resistor 86 in parallel with a 0.1 µF capacitor 88 which are across the negative feedback loop of the op amp 84. At the positive input of the op-amp 84 is a 10k ohm hold down resistor 90 and at the inverting input there is a 20K ohm series resistor 92 with a 10K ohm resistor 94 in parallel with a variable 1K ohm resistor 96 positioned between two additional 1K ohm resistors 98 and 100 which are each tied to a voltage of −5 volt and +5 volts, respectively. This creates a clean DC output voltage which is applied to the VCO 66. The variable 1K ohm resister 96 provides a voltage bias term for the VCO 66 to allow centering of the VCO 66 operating voltage near zero (0) phase error at the standard 17.72 MHz frequency, maximizing the phase-locked or frequency-locked loop generating range.

A more detailed description of the digital phase error detector 10 is described in application Ser. No. 08/571,108 entitled "DIGITAL PHASE ERROR FOR LOCKING TO COLOR SUBCARRIER OF VIDEO SIGNALS", naming as inventors Gregory A. Shreve, Kim S. Guzzino and Robert W. Hulvey (TRW Docket No. 12-0686), filed concurrently herewith which is hereby incorporated by reference.

Figure 6:
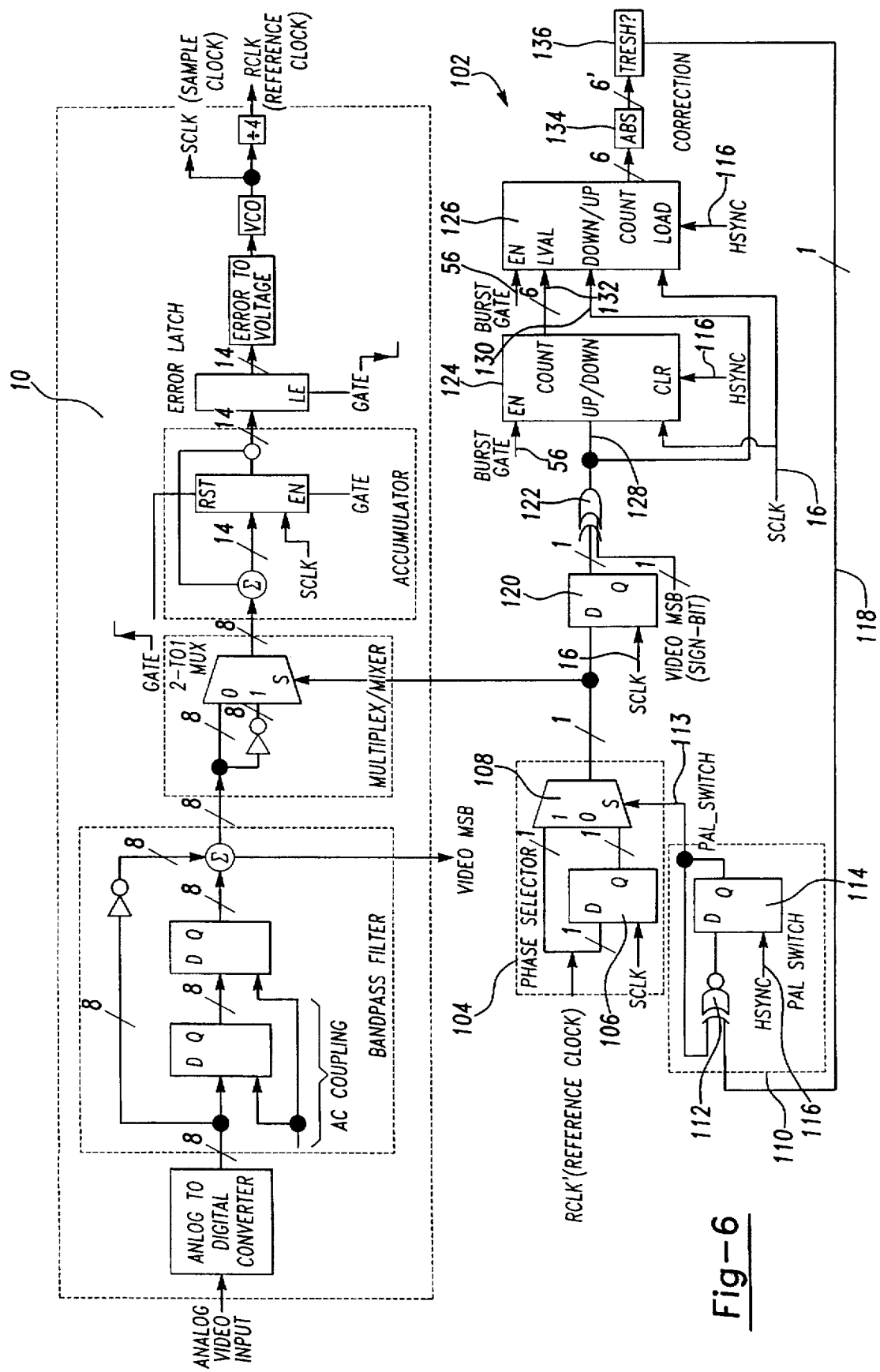
FIG. 6 is a schematic block diagram of one preferred embodiment of the present invention which utilizes the digital phase error detector.

Referring to FIG. 6, a schematic block diagram of a digital color burst phase switch 102 for PAL video signals 13 is shown in operation with the digital phase error detector 10. The digital color burst phase switch 102 includes a phase selector 104 consisting of a 1-bit digital register 106 and a 2 to 1 multiplexer 108. The phase selector 104 selects the correct phase for the reference clock (RCLK) 36 as the color burst signal 14 in the PAL video signal 13 alternately advances and retreats by 90°. The reference clock (RCLK) 36 from the digital phase error detector 10, now referred to as RCLK', is applied to a D-input of the 1-bit digital register 106. The digital register 106 is clocked by the sample clock (SCLK) 16 such that the Q-output from the digital register 106 is the RCLK' delayed by 90° or RCLK' - 90°. The RCLK' - 90° signal is applied to a 0-input of the multiplexer 108 while the RCLK' signal without the delay is applied to a 1-input of the multiplexer 108. The output of the multiplexer 108 essentially toggles between RCLK' and RCLK' - 90° depending on the selection input (i.e., S-input) to the multiplexer 108 from a PAL switch generator 110. Once the digital color burst phase switch 102 is correctly locked to the alternating phase of the color burst signal 14, the phase selector 104 will alternately toggle to select the correct phase of the reference clock (RCLK) 36 which is subsequently applied to the digital phase error detector 10.

The PAL switch generator 110 controls the selection of whether the RCLK' signal or the RCLK' - 90° signal will be outputted by the phase selector 104. The PAL switch generator 110 includes an exclusive NOR gate 112 and a 1-bit digital register 114. A Q-output from the digital register 114 is applied to the S-input of the multiplexer 108 to select the output of the multiplexer 108. The Q-output is also applied to one of the inputs to the exclusive NOR gate 112. Assuming the other input to the exclusive NOR gate 112 remains low (i.e. "0"), the PAL switch generator 110 will toggle to generate alternating high/low Q-outputs 113 each time the digital register 114 is clocked by a horizontal sync pulse 116, as shown in FIG. 7 (i.e. PAL SWITCH 113).

For example, assuming the Q-output from the digital register 114 is high (i.e. "1") this high output is applied to the input of the exclusive NOR gate 112. With the other input to the exclusive NOR gate 112 being low (i.e. "0"), the exclusive NOR gate 112 provides a low output which is applied to the D-input of the digital register 114. This low output passes through the digital register 114 on the next horizontal sync pulse 116. The Q-output from the digital register 114 is then low which is again applied to the exclusive NOR gate 112. With the two inputs to the exclusive NOR gate 112 now being low, the output is high which passes through the digital register 114 on the next horizontal sync pulse 116, and so forth. In order to delay the PAL switch generator 110 from toggling a high/low output (i.e.

PAL-SWITCH 113) which subsequently toggles the multiplexer 108, the other input to the exclusive NOR gate 112, known as the correction input 118, must provide a high input, as shown in FIG. 7 and discussed in detail later.

Figure 8:
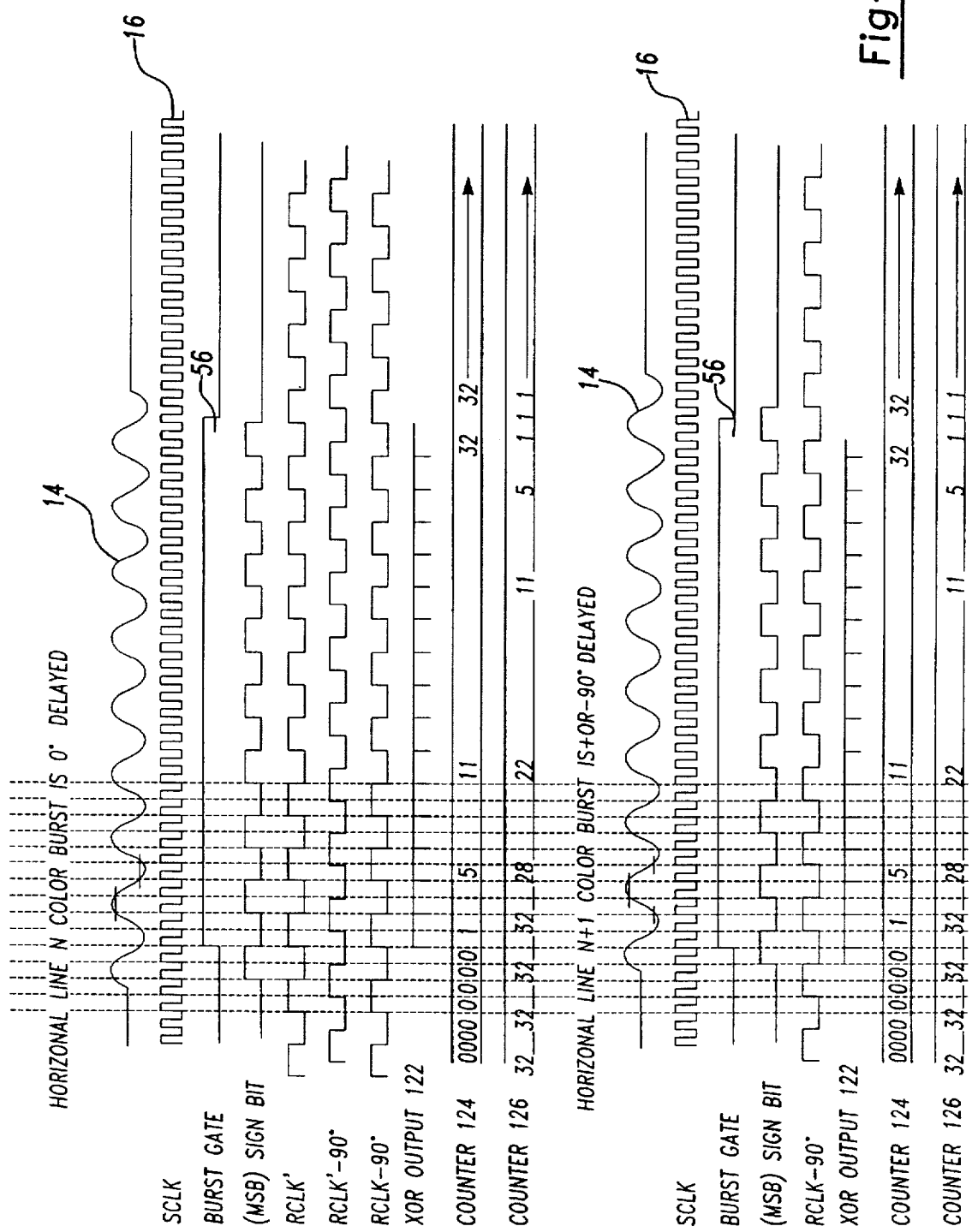
FIG. 8 is a series of timing waveform diagrams utilized and generated by the present invention; when a PAL switch is set correctly.
Figure 9:
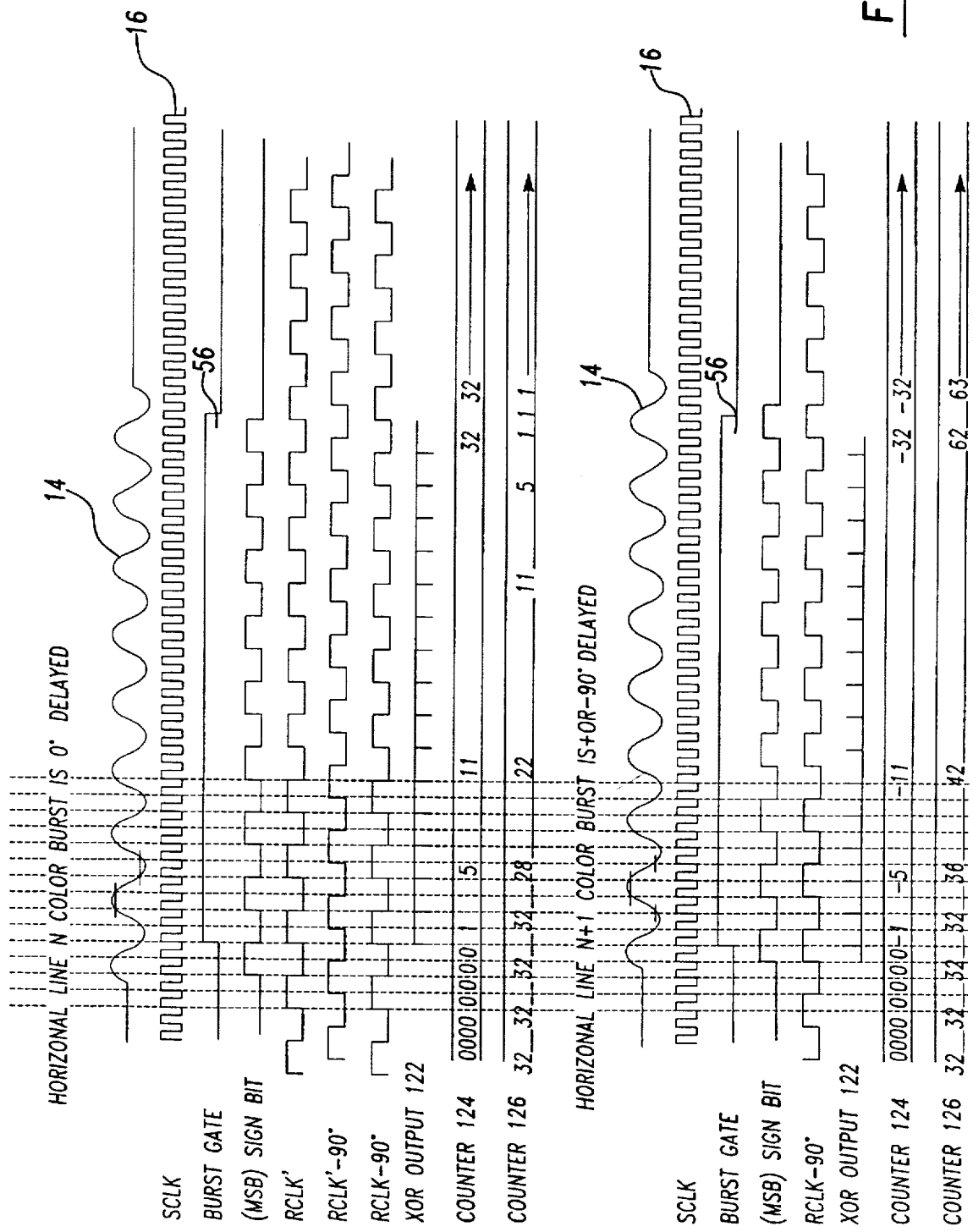
FIG. 9 is a series of timing waveform diagrams utilized and generated by the present invention when the PAL switch is set wrong.

Referring to FIGS. 8 and 9, the output from the multiplexer 108 is either the RCLK' signal or the RCLK' - 90° signal which is the resultant reference clock (RCLK) 36 corrected for the alternating phase of the color burst signal 14. This output is applied to the multiplier 38 and to a delay circuit or 1-bit digital register 120. The 1-bit digital register 120 receives the reference clock (RCLK) 36 at a D-input and outputs the reference clock (RCLK) 36 at a Q-output which has been delayed by one sample clock (SCLK) 16 or by 90° (i.e. RCLK- 90°). The Q-output from the digital register 120 is applied to a phase comparator 122 which consists of an exclusive OR gate 122. The most significant bit (MSB) or sign bit from the adder 26 in the digital phase error detector 10 is also applied to the exclusive OR gate 122. Since both the digital phase error detector 10 and the digital color burst phase switch 102 utilize 2's (two's) complement digital signals, the most significant bit from the adder 26 represents the color burst signal 14 in substantially the same way as the reference clock (RCLK) 36 represents a continuous internally generated sine wave. Because of this, assuming that the color burst signal 14 is locked to the sample clock 16, except for the 90° phase shift because of the PAL video signal 13, the phase comparator 122 will either see a phase of 0° or 180°. That is, the (MSB) sign bit signal will either be in phase (i.e. 0°) or 180° out of phase with the RCLK- 90° signal.

If the RCLK- 90° signal from the Q-output of the digital register 120 is in phase (i.e. 0°) with the color burst signal 14, the inputs to the phase comparator 122 (i.e. "MSB" and "RCLK- 90°") will alternate between two pairs of low inputs and two pairs of high inputs which causes a continuous low output from the phase comparator 122, as seen in the second set of waveform diagrams of FIG. 9 (i.e. "XOR output"). If the RCLK- 90° signal from the Q-output of the digital register 120 is 180° out of phase with the color burst signal 14, the inputs to the phase comparator 122 (i.e. "MSB" and "RCKL- 90°") will toggle between two pairs of low/high inputs and two pairs of high/low inputs which causes a continuous high output from the phase comparator 122, as seen in FIG. 8 (i.e. "XOR output").

The control or XOR output from the exclusive OR gate 122 is applied to a first accumulator 124 and a second accumulator 126 each of which essentially performs an integration function. The first and second accumulators 124 and 126 consist of 6-bit digital up/down counters 124 and 126. The first up/down counter 124 counts up (i.e. accumulates) or integrates plus-one's when it receives a high input at input 128 and counts down (i.e. decrements) or integrates minus one's when it receives a low input at input 128. Conversely, the second up/down counter 126 counts down or integrates minus one's when it receives a high input at an input 130 and counts up or integrates plus one's when it receives a low input at the input 130. Thus, the first and second accumulators 124 and 126 are alternately incremented or decremented depending on the XOR output of the exclusive OR gate 122.

The up/down counters 124 and 126 are clocked by the sample clock (SCLK) 16 and are enabled or active only when the burst gate signal 56 is high. Because of this, the up/down counters 124 and 126 accumulate or integrate over substantially the entire color burst signal 14 while the burst gate signal 56 is high. This accumulation or integration during substantially the entire color burst signal 14 provides substantial noise immunity of about 15 dB for the phase switch 102. Upon accumulating an integration value for one (1) color burst signal 14, the first up/down counter 124 is cleared as it receives the horizontal sync pulse 116, while the second up/down counter 126 is simultaneously loaded with the count value in the first up/down counter 124 at a LVAL-input 132.

Referring to FIG. 8, the operation of the digital color burst phase switch 102 is shown when the PAL switch generator 110 is toggling correctly (i.e. PAL-SWITCH 113). In FIG. 8, the RCLK- 90 signal is shown 180° out of phase with the (MSB) sign bit signal or color burst signal 14 which causes two pairs of low/high inputs and two pairs of high/low inputs to be applied to the phase comparator 122, as shown in the first set of waveform diagrams of FIG. 8. The output from the phase comparator 122 is then continuously high (i.e. "XOR output"). Because of this, the first up/down counter 124 will count up during the burst gate signal 56, which has a duration of between about 6–10 sample clocks (SCLK 16). Making the assumption that eight (8) sample clocks occur during a burst gate signal 56, the first up/down counter 124 will count up to a count value of +32 and the second up/down counter 126, assuming that it was previously loaded with a count value of +32, will count to an integration value of 0. Upon receiving the next horizontal sync pulse 116, the first up/down counter 124 is cleared and the second up/down counter 126 is loaded with the value in the first up/down counter 124, via LVAL-input 132, so that the second up/down counter 126 now holds an integration value of +32 (see "Normal Operation" in FIG. 7).

During the next horizontal line or color burst signal 14, the color burst signal 14 is shifted by + or −90° which causes the (MSB) sign bit signal to shift by + or −90°, respectively. In addition, since the PAL switch generator 110 is operating correctly, the PAL-SWITCH 113 toggles the multiplexer 108 correctly such that the RCLK- 90 signal is also shifted by 90°. This causes the (MSB) sign bit signal to continue to be 180° out of phase with the RCLK- 90° signal which causes two pairs of high/low inputs and two pairs of low/high inputs to be applied to the phase comparator 122. This causes the phase comparator 122 to continuously output a high output causing the up/down counter 124 to count up to a count value of +32, while the second up/down counter 126 counts down to an integration value of zero.

At the next color burst signal 14, the color burst signal 114 is switched 90° while the RCLK- 90 signal is again switched 90° so that the phase comparator is again 180° out of phase which provides a continuous high output from the phase comparator 122 (i.e. "XOR output"). Because of this, the high output causes the first counter 124 which has been cleared by the horizontal sync pulse 126 to again count up to the count value of +32 during the burst gate signal 56. The second up/down counter 126 which was loaded with the previous value of the first counter 124 which consisted +32, again counts down to an integration value of zero. Thus, as the phase shifts between 0° and 90° for the color burst signal 14, the (MSB) sign bit signal and the RCLK- 90° signal concurrently change phase by 90° such that they remain 180° out of phase with each other, thereby causing the output from the second up/down counter 126 to always count down to a value of about zero.

In addition, it should be noted that the XOR output when correct will either be high for every horizontal line or low for every horizontal line. If high, the first up/down counter 124 will count upwards to +32, or less if the input signal is noisy on each line as discussed above. If low, the first up/down counter 124 will count downward to −32 on each line. In either case, the second up/down counter 126 is loaded with the first up/down counter 124 ending value and proceeds to count in the opposite direction, so that it ends up around zero for each horizontal line. In other words, if the (MSB) sign bit signal is also in phase (i.e. 0°) with the RCLK -90 signal for each horizontal line, the XOR output will be a continuous low output for each horizontal line, thereby causing the PAL switch generator 110 to toggle the PAL switch output 113 correctly.

Conversely, if the PAL switch generator 110 is not switching properly or wrong, the XOR output will toggle between either a high/low or a low/high output on consecutive horizontal lines as shown in FIG. 9.

Assuming the RCLK - 90 signal is 180° out of phase with the color burst signal 14 or the (MSB) sign bit signal, a pair of low/high inputs and a pair of high/low inputs are applied to the phase comparator 122, as shown in the first set of waveform diagrams in FIG. 9. The XOR output from the phase comparator 122 is a continuous high which causes the first up/down counter 124 to count up to a value of +32, while the second up/down counter counts down to a value of zero. Upon receiving the next horizontal sync pulse 116, the first up/down counter 124 is cleared and the second up/down counter 126 is loaded with the value in the first up/down counter 124, via LVAL-input 132, so that the second up/down counter 126 now holds a value of +32.

During the next color burst signal 14, the color burst signal 14, will be either advanced or delayed by 90° and the corresponding (MSB) sign bit signal will also be advanced or delayed by 90°, respectively. In addition, since the PAL switch generator 110 is not toggling correctly, the RCLK - 90° signal will be offset + or −90° opposite the (MSB) sign bit signal which causes the (MSB) sign bit signal to be in phase with the RCLK - 90° signal. This condition causes two pairs of high inputs and two pairs of low inputs to be applied to the phase comparator 122 which causes a continuous low XOR output, as shown in the second portion of the waveform diagram in FIG. 9. This causes the first up/down counter 124 to count down to a value of −32 while the second up/down counter 126 counts from a value of +32 up to a value of +64.

The output from the second up/down counter 126 is applied to an absolute value circuit (ABS) 134 which takes the absolute value of the accumulated or integrated value applied to it and applies the absolute value to a threshold circuit 136. The absolute value circuit 134 generally consists of a circuit which analyzes the sign bit or most significant bit (MSB) from the digital data applied to it and converts the digital signal to a positive digital signal. For instance, if the most significant bit (MSB) is a low or "0", under 2's complement, this indicates that the value is positive and no further action is needed. If the most significant bit (MSB) is high or a "1", this indicates that the value is negative, at this point the absolute value circuitry 134 will invert all 6 bits and add one to the least significant bit (LSB) thereby causing the negative digital value to be changed to a positive digital value.

The threshold circuit 136 is preferably a 6-bit binary weighted comparator which compares the 6-bit digital data from the absolute value circuit 134 to a threshold. If the digital data exceeds the threshold, the threshold circuit 136 provides a 1-bit high output. If the value is less than the threshold, the threshold circuit 136 provides a low output. These outputs are known as the correction signal 118. The threshold is typically set above the maximum absolute value the counters 124 and 126 could count to in one burst gate signal 56 (i.e. 6 to 10 sample clocks). Thus, assuming that a burst gate 56 lasts for about 8 sample clocks, the threshold would be set to about 50.

Accordingly, if the PAL switch generator 110 is operating properly, the value in the second up/down counter 126 remains at about ±0. Since this value is less than 50, the threshold circuit 136 provides a low correction signal 118 to the input of the exclusive NOR gate 112, as shown in the normal operation portion of FIG. 7. This causes the PAL switch generator 110 to continue to toggle a correct PAL-SWITCH 113, thereby causing the phase selector 104 to output the correct reference clock (RCLK) 36. It should be noted that portion 119 of the correction signal 118 occurs during the intermediate state of the counters 124 and 126 while the burst gate 56 is high. Portion 119 is an unknown state that can be either high or low, but does not effect the operation of the phase switch 102.

If the PAL switch generator 110 is operating incorrectly or wrong, the output from the second up/down counter 126 will generally be about ±64. Since this is more than the threshold of 50, the threshold circuit 36 outputs a high correction signal 118, shown in the PAL switch started wrong portion of FIG. 7, which causes the PAL switch generator 110 to stop toggling or be delayed from toggling for one horizontal sync pulse 116. This ultimately causes the phase selector 104 to then select the correct reference clock (RCLK) 36 thereby correctly setting the PAL switch generator 110 in sync with the alternating phase of the color burst signal 14. This ultimately allows the phase error detector 10 to lock to the phase alternating color burst signal 14.

It should be noted that at system start-up, the phase error detector 10 interacts with the phase switch 102 as follows. The reference clock (RCLK) 36 is used in the phase detector 10, in combination with the color burst signal 14, to provide a phase error to adjust and correct the voltage controlled oscillator (VCO) 66. Since the phase of the reference clock (RCLK) alternates by 90° in each horizontal line, as does the color burst signal 14, it may appear that during initial acquisition of a new video signal 13, the phase error could be corrupted by the uncoordinated phase switching of these two signals, preventing the sample clock (SCLK) 16 from properly locking to the color burst signal 14. This however does not happen for the following reasons. First, the free running frequency of the sample clock (SCLK) 16 is so close (within a few hundred parts per million) to the locked frequency, that the phase of the reference clock (RCLK) 36 and the color burst signal 14 are essentially constant during the interval of the color burst signal 14. This provides a valid indication of the relative phases of the RCLK - 90° signal and color burst sign bit (MSB) to be input to the phase comparator 122, thus allowing the phase switch 102 to correctly determine the correct toggling phase of PAL-SWITCH 113 even before the sample clock (SCLK) 16 is fully locked. Thus, since the reference clock (RCLK) 36 is properly switching + and −90° in phase with the color burst signal 14, the phase error is valid in each horizontal line causing the phase detector 10 to work as intended.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A digital color burst phase switch for determining phase shift of a color burst signal, said digital color burst phase switch comprising:

phase selection means for selecting either a first reference clock signal or a second reference clock signal in response to a switch signal;

phase delay means for altering the phase of either said first reference clock signal or said second reference clock signal selected by said phase selection means to generate a third reference clock signal;

phase comparison means for comparing the phase of said third reference clock signal to the phase of said color burst signal to generate a control signal;

integration means for integrating said control signal during substantially the entire color burst signal to generate an integration value;

threshold means for comparing said integration value with a threshold value to generate a correction signal; and switch means for generating said switch signal, wherein said switch means is responsive to said correction signal such that said phase selection means selects either said first reference clock signal or said second reference clock signal having a phase substantially corresponding to said color burst signal.

2. The digital color burst phase switch as defined in claim 1 wherein said phase selection means includes a 2 to 1 multiplexer operable to receive said first reference clock signal and said second reference clock signal and output either said first reference clock signal or said second reference clock signal in response to said switch signal.

3. The digital color burst phase switch as defined in claim 2 wherein said phase selection means further includes a 1-bit digital register operable to delay said first reference clock signal by a sample clock pulse to generate said second reference clock signal.

4. The digital color burst phase switch as defined in claim 3 wherein said 1-bit digital register delays said second reference clock signal by 90° with respect to said first reference clock signal.

5. The digital color burst phase switch as defined in claim 1 wherein said phase delay means includes a 1-bit digital register operable to delay the phase of either said first reference clock signal or said second reference clock signal by a sample clock pulse.

6. The digital color burst phase switch as defined in claim 1 wherein said phase comparison means includes an exclusive OR gate operable to compare the phase of said third reference clock signal to the phase of said color burst signal to generate said control signal.

7. The digital color burst phase switch as defined in claim 1 wherein said integration means includes a first accumulator operable to increment either up or down in response to said control signal during substantially the entire color burst signal to generate a count value.

8. The digital color burst phase switch as defined in claim 7 wherein said integration means further includes a second accumulator operable to increment either down or up in response to said control signal during substantially the entire color burst signal to generate said integration value.

9. The digital color burst phase switch as defined in claim 8 wherein said count value from said first accumulator is loaded into said second accumulator during a horizontal sync pulse while said first accumulator is simultaneously cleared.

10. The digital color burst phase switch as defined in claim 1 wherein said threshold means includes an absolute value device operable to generate an absolute value of said integration value.

11. The digital color burst phase switch as defined in claim 10 wherein said threshold means further includes a binary weighted comparator for comparing said integration value from said absolute value device with said threshold value to generate said correction signal.

12. The digital color burst phase switch as defined in claim 1 wherein said switch means includes an exclusive NOR gate and a digital register having a feedback loop applied to an input of said exclusive NOR gate, said digital register operable to toggle said switch signal high and low in response to a horizontal sync pulse.

13. The digital color burst phase switch as defined in claim 12 wherein said correction signal is applied to an input of said exclusive NOR gate to inhibit said switch signal from toggling in response to said horizontal sync pulse.

14. A digital color burst phase switch for determining phase shift of a color burst signal in a PAL video signal, said digital color burst phase switch comprising:

a phase selector, said phase selector operable to select either a first reference clock signal or a second reference clock signal in response to a PAL switch signal;

a phase delay device, said phase delay device operable to delay the phase of either said first reference clock signal or said second reference clock signal selected by said phase selector to generate a third reference clock signal;

a phase comparator, said phase comparator operable to compare the phase of said third reference clock signal to the phase of said color burst signal to generate a control signal;

a counter device, said counter device operable to either count up or count down in response to said control signal during substantially the entire color burst signal to generate an accumulated value;

a threshold device, said threshold device operable to compare an absolute value of said accumulated value with a threshold value to generate a correction signal; and a PAL switch generator, said PAL switch generator operable to generate said PAL switch signal, wherein said PAL switch generator is responsive to said correction signal such that said phase selector selects either said first reference clock signal or said second reference clock signal having a phase substantially corresponding to said color burst signal.

15. The digital color burst phase switch as defined in claim 14 wherein said phase selector includes a multiplexer and a digital register, said digital register operable to delay said first reference clock signal by a sample clock pulse to generate said second reference clock signal, said multiplexer operable to receive said first reference clock signal and said second reference clock signal and output either said first reference clock signal or said second reference clock signal in response to said PAL switch signal.

16. The digital color burst phase switch as defined in claim 14 wherein said phase delay device includes a digital register operable to delay the phase of either said first reference clock signal or said second reference clock signal by a sample clock pulse to generate said third reference clock signal.

17. The digital color burst phase switch as defined in claim 14 wherein said phase comparator includes an exclusive OR gate operable to compare the phase of said third reference clock signal to the phase of said color burst signal to generate said control signal by comparing a 1-bit digital representation of said third reference clock signal to a sign bit of said color burst signal.

18. The digital color burst phase switch as defined in claim 14 wherein said counter device includes a first up/down counter and a second up/down counter, said first up/down counter operable to either count up or count down in response to said control signal and said second up/down counter operable to either count down or count up in response to said control signal in reverse respect to said first counter to generate said accumulated value.

19. The digital color burst phase switch as defined in claim 18 wherein said switch means includes an exclusive NOR gate and a digital register having a feedback loop applied to an input of said exclusive NOR gate, said digital register operable to toggle said PAL switch signal high and low in response to a horizontal sync pulse, said correction signal operable to inhibit said PAL switch signal from toggling in response to said horizontal sync pulse.

20. A method for determining phase shift of a color burst signal in a PAL video signal, said method comprising the steps of:

generating a first reference clock signal and a second reference clock signal;

selecting either said first reference clock signal or said second reference signal in response to a PAL switch signal;

phase delaying either said first reference clock signal or said second reference clock signal selected in response to said PAL switch signal to generate a third reference clock signal;

comparing the phase of said third reference clock signal to the phase of said color burst signal to generate a control signal;

integrating said control signal over substantially the entire color burst signal to generate an integration value;

comparing said integration value with a threshold value to generate a correction signal; and generating said PAL switch signal in response to said correction signal, wherein said first reference clock signal or said second reference clock signal is selected having a phase substantially corresponding to said color burst signal.

21. The method as defined in claim 20 wherein the step of generating said first reference clock signal and said second reference clock signal includes the step of delaying the phase of said second reference clock signal by about 90° with respect to said first reference clock signal.

22. The method as defined in claim 20 wherein the step of delaying the phase of either said first reference clock signal or said second reference clock signal further includes the step of delaying the phase of either said first reference clock signal or said second reference clock signal by about 90°.

23. The method as defined in claim 20 wherein the step of integrating said control signal further includes the steps of:

accumulating a count value in response to said control signal in a first accumulator and;

accumulating said integration value in response to said control signal in a second accumulator.

24. The method as defined in claim 23 further comprising the steps of:

clearing said count value in said first accumulator upon receiving a horizontal sync pulse; and simultaneously loading said count value into said second accumulator upon receiving said horizontal sync pulse.

* * * * *